No. 774,055. PATENTED NOV. 1, 1904.
L. J. ELLIOTT & J. REICHERT.
DRIVING BIT.
APPLICATION FILED JULY 30, 1902.
NO MODEL

Witnesses
Geo. E. Prech
E. R. Pick

Inventors
L. J. Elliott
John Reichert.
by
Hubert E. Pick
Attorney

No. 774,055.

Patented November 1, 1904.

UNITED STATES PATENT OFFICE.

LUCIUS J. ELLIOTT AND JOHN REICHERT, OF RACINE, WISCONSIN.

DRIVING-BIT.

SPECIFICATION forming part of Letters Patent No. 774,055, dated November 1, 1904.

Application filed July 30, 1902. Serial No. 117,709. (No model.)

*To all whom it may concern:*

Be it known that we, LUCIUS J. ELLIOTT and JOHN REICHERT, citizens of the United States, residing at Racine, county of Racine, State of Wisconsin, have invented certain new and useful Improvements in Driving-Bits; and we do hereby declare the following to be a full, clear, and exact description of the invention, such as will enable others skilled in the art to which it appertains to make and use the same.

This invention relates to certain improvements in driving or bridle bits.

An object of the invention is to provide an ordinary single centrally-jointed mouth-bar bit with loosely-mounted devices arranged to automatically adjust themselves to the width of the animal's mouth and to control the animal by pressing against the lower jaw without injury thereto and whereby the objections incident to the use of slotted and double mouth-bar bits and to the use of nose-bands and curbs will be avoided and which will be very easy on the mouth the moment that pressure on the reins is relaxed.

The invention consists in certain novel features in construction and in combinations and arrangements of parts, as hereinafter more fully specified and set forth.

Figure 1:
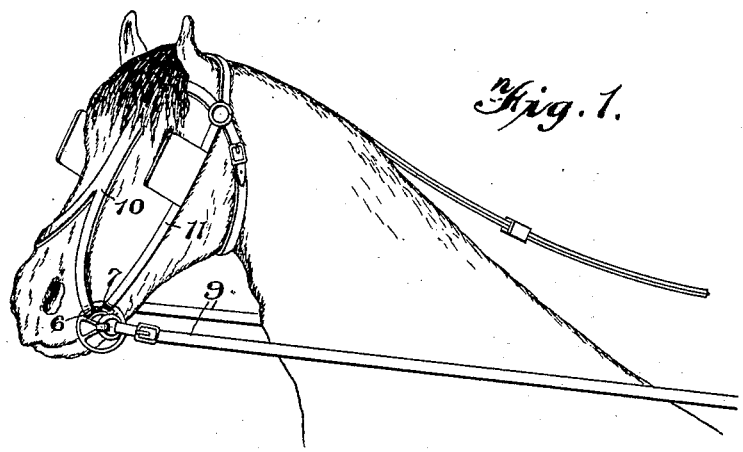
Figure 2:
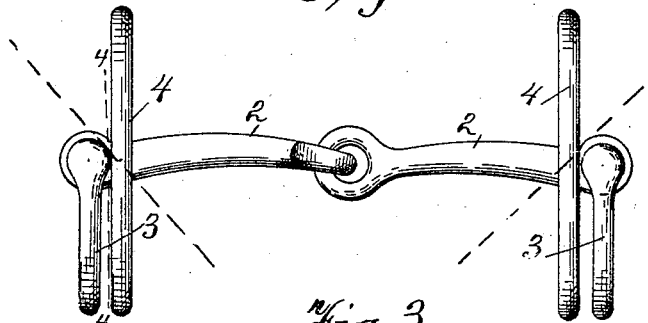
Figure 3:
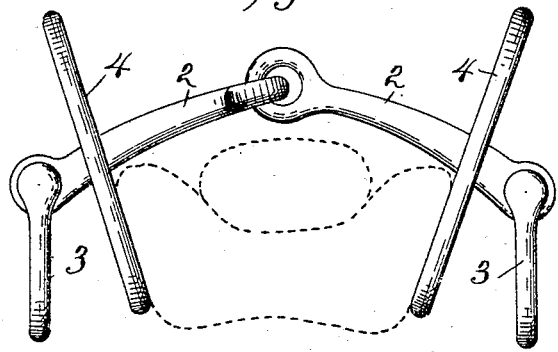
Figure 4:
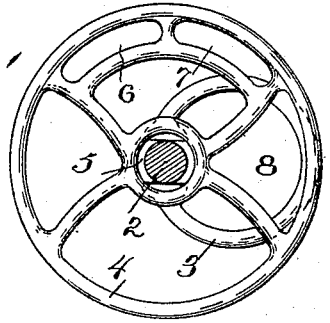
Figure 5:
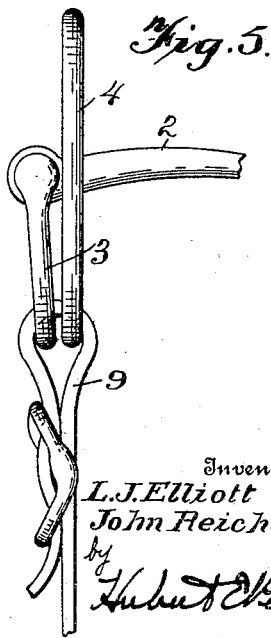

Referring to the accompanying drawings, which show a construction as an example for purposes of illustration of a device within the spirit and scope of our invention, Figure 1 shows our bit as applied in use. Fig. 2 is a top plan view of the bit, dotted lines indicating the angle to which each cheek-piece can swing with respect to the mouth-bar. Fig. 3 is a plan view of the bit, showing a position assumed by the same when pressure is applied thereto by the reins, dotted lines indicating the lower jaw of the animal and showing how the cheek-pieces press flat against the sides of the jaw. Fig. 4 is a cross-sectional view on the line 4 4, Fig. 2, showing the large size of the central opening of the cheek-piece with respect to the mouth-bar. Fig. 5 is a top plan of a portion of the bit, showing a rein passed through a rein-ring and an eye of the cheek-piece.

In the drawings, 2 2 are the links or sections composing the single mouth-bar of the bit. At their inner ends these sections or links are suitably hinged or jointed together—as, for instance, by the two eyes passing through each other, as usual, and each formed integral with its link. The outer extremities of the mouth-bar are formed with transverse eyes or openings loosely receiving and confining the rein-rings 3 3 to the outer ends of the mouth-bar, as usual, so that the rein-rings are free to swing. The mouth-bar is preferably solid or imperforate between the rein-rings and the center joint or hinge. Each section or link of the mouth-bar is usually tapered or gradually reduced from its outer end toward its inner end and is longitudinally curved between its ends, usually so that its front edge is longitudinally convex and its rear edge correspondingly longitudinally concave.

4 4 are the two loose cheek-pieces, mounted to freely slide, turn, and rock on the mouth-bar. Each cheek-piece is formed of a single piece of metal with a central eye or opening 5, receiving the mouth-bar and having a diameter considerably greater than the largest external diameter of the mouth-bar between the rein-rings and center hinge. This center opening of each cheek-piece is preferably so proportioned with respect to the mouth-bar that the cheek-pieces can rock on the mouth-bar and assume a position at about an angle of forty-five degrees with the mouth-bar. The cheek-pieces are of such a size as to extend rearwardly beside the lower jaw of the animal and are extended upwardly, and each at its top portion is provided with an eye or opening 6 to receive the checkrein and with another eye or opening 7 to receive the bridle-cheek. We show the cheek-pieces in the form of rings each having a radius approximately equal to the diameter of a rein-ring, so that the rear portion of the ring can rest beside and against the rear portion of the cheek-piece, and we usually provide the rear portion of each cheek-piece with an eye, loop, or opening 8 capable of registering or coinciding with the rein-ring, so that, if desired, either or both reins or lines 9 can be passed through its rein-ring and through the corresponding loop or opening 8 of its cheek-piece to hold the cheek-pieces and rein-rings together for the purpose hereinafter set forth. As at present advised we do not, however, wish to limit ourselves to the circular formation of the cheek-pieces, as they can be otherwise formed to extend rearwardly beside the lower jaw and upwardly to receive the bridle-cheek and check-strap.

11 is the bridle cheek-strap, and 10 is the checkrein, which are attached to the cheek-pieces of the bit, as hereinbefore described, to properly adjust the cheek-pieces to and hold the bit in the mouth. Advantages are attained by thus attaching the bridle-cheeks and the checkrein directly to the peculiar loosely-mounted cheek-pieces, in which the mouth-bar can turn and also slide longitudinally, as the driver is thereby given absolute independent control of the mouth-bar of the bit through the medium of the rein and the loose end rein-ring. When the pressure or pull of the reins on the bit is relaxed, the cheek-pieces rest loosely at the ends of the mouth-bar and do not press against the jaw of the animal, but merely serve to hold the bit in the mouth, rendering the bit very easy on the mouth, the cheek-pieces by reason of their large central openings automatically adjusting themselves to the width of the particular animal's mouth. When pressure is applied on the bit through the medium of the reins and rein-rings, the mouth-bar will slide through the cheek-pieces, bringing them flat against the under jaw of the animal, and by reason of the wedging or locking of the cheek-pieces on the mouth-bar when the mouth-bar assumes the angle of approximately forty-five degrees with the cheek-pieces the cheek-pieces will be drawn with the necessary pressure inwardly against the lower jaw of the animal, thereby giving the driver perfect control over the animal. By reason of the peculiar formation of the mouth-bar with respect to the cheek-pieces the edges of the cheek-pieces are not driven into the lower jaw of the animal, as would be the case were the cheek-pieces maintained approximately at an angle of ninety degrees with the mouth-bar. By reason of our peculiar construction the cheek-pieces press their flat side faces against the lower jaw of the animal even when great pressure is applied to the bit. As soon as the pressure on the bit is released or relaxed the cheek-pieces are at once released and move freely and loosely on the mouth-bar, relieving the pressure on the jaw of the animal. Advantages are also attained in rendering the bit more easy and humane by having the cheek-pieces so mounted on the mouth-bar that the mouth-bar is free to turn or rock axially in the cheek-pieces without disturbing the position of the cheek-pieces, also by employing the single mouth-bar, which avoids the danger of cutting and bruising the animal's tongue and avoids "wind-sucking" and "slobbering," which are incident to the use of double mouth-bars and slotted mouth-bars, which prevent free turning of the mouth-bar within the cheek-pieces and prevent the automatic adjustment or proper easy fitting of the cheek-pieces to the animal's jaw.

The cheek-pieces can be thrown out of action or prevented from coacting with the mouth-bar in exerting pressure against the lower jaw by passing the reins or lines through the loops 8 of the cheek-pieces and also through the corresponding rein-rings, so as to hold the cheek-pieces to the rein-rings, thereby causing the bit to act as an ordinary easy bit without means for the application of pressure to the exterior of the animal's mouth or jaws.

As some horses pull harder on one rein than on the other, it is sometimes desirable to adjust the bit to be easy on one side and severe on the other, and thereby force the animal to carry his head straight and pull evenly. This can be accomplished by coupling the cheek-piece and rein-ring together at one end of the bit, as just described, and leaving the cheek-piece at the other end of the bit free to press against the lower jaw and perform its intended function.

The action of this bit is based on the well-understood fact that important nerve centers are arranged along opposite sides of the lower jaw of the horse and that slight pressure upon these nerves will cause a horse to yield and succumb with slight exertion on the part of the driver when a bit of the proper construction is employed. However, if the bit is not of the proper construction the horse is often seriously injured by reason of the improper application of the pressure or by the application of excessive pressure concentrated along narrow lines.

Having thus fully described our invention, what we claim as new, and desire to secure by Letters Patent of the United States, is—

1. The bit comprising the single-jointed mouth-bar having end rein-rings, and the two separate independent cheek-pieces loosely confined to independently slide longitudinally of and rock laterally on the mouth-bar, said cheek-pieces formed for attachment to the bridle and extended rearwardly beside said rings and to press against the lower jaw of the animal, each cheek-piece having the intermediate opening receiving and so formed with respect to the mouth-bar as to lock or wedge the cheek-piece on the mouth-bar when tilted laterally to a certain angle as described, whereby the independent cheek-pieces are forced inwardly with their flat faces against the lower jaw of the animal when pressure is exerted on the mouth-bar through the reins.

2. The bit comprising a single intermediately-jointed mouth-bar having loose end rein-rings and the two independent cheek-pieces freely sliding and rocking on the mouth-bar, the mouth-bar being freely turnable in the cheek-pieces, the cheek-pieces having eyes for the attachment of the bridle-cheek, checkrein, and reins, and extending rearwardly beside the said rings and having a radius equal to the length or diameter of said rings, each cheek-piece having the intermediate opening receiving and slightly larger than said mouth-bar, whereby the cheek-pieces have an independent limited rocking movement on said bar and lock or wedge to said bar when tilted to a certain angle therewith for the purposes stated.

In testimony whereof we affix our signatures in presence of two witnesses.

LUCIUS J. ELLIOTT.
JOHN REICHERT.

Witnesses:
HERBERT S. BLAKE,
ROY H. BEEBE.